United States Patent
Lipscomb et al.

(10) Patent No.: US 8,408,614 B2
(45) Date of Patent: *Apr. 2, 2013

(54) SIFTING SCOOP

(75) Inventors: John M. Lipscomb, Cedarburg, WI (US); Qing He, North Andover, MA (US)

(73) Assignee: Pioneer Pet Products, LLC, Cedarburg, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/074,897

(22) Filed: Mar. 29, 2011

(65) Prior Publication Data

US 2011/0266817 A1 Nov. 3, 2011

Related U.S. Application Data (63) Continuation-in-part of application No. 13/068,843, filed on Mar. 29, 2010.

(51) Int. Cl.
*A01K 29/00* (2006.01)
(52) U.S. Cl. .................... 294/1.3; 294/179
(58) Field of Classification Search ............ 294/1.3, 294/179, 1.4, 1.5, 176, 180; 119/161; 209/417, 209/418, 419; 210/473–482, 238, 464, 465, 210/470, 497.01, 800; 73/426–429; 99/413, 99/508; D7/667–668, 400; D10/46.2

See application file for complete search history.

(56) References Cited

U.S. PATENT DOCUMENTS

| | | | |
|---|---|---|---|
| 3,354,575 A * | 11/1967 | Darrow ............................. 43/56 |
| D255,951 S | 7/1980 | Halls et al. |
| D332,675 S | 1/1993 | Simon |
| D337,244 S | 7/1993 | Kilham |
| D347,497 S | 5/1994 | VanSkiver |
| 5,536,055 A * | 7/1996 | Kohn .......................... 294/1.3 |
| 5,580,111 A | 12/1996 | Bohn |
| D387,514 S | 12/1997 | Savicki |
| 5,921,596 A * | 7/1999 | Sheriff et al. ............... 294/1.4 |
| 6,022,058 A | 2/2000 | O'Rourke |
| 6,039,887 A * | 3/2000 | Licari ......................... 210/800 |
| D437,192 S | 2/2001 | Verherbrugghen et al. |
| 6,416,097 B1 * | 7/2002 | O'Rourke .................. 294/179 |
| D467,472 S * | 12/2002 | de Vries ....................... D7/667 |
| 6,578,807 B1 | 6/2003 | Lipscomb et al. |
| D485,025 S | 1/2004 | Edwards et al. |
| D490,943 S | 6/2004 | Logan |
| D507,851 S | 7/2005 | Tsengas et al. |
| 6,976,661 B2 | 12/2005 | Lipscomb et al. |
| D533,471 S * | 12/2006 | Jordan .................... D10/46.2 |

(Continued)

*Primary Examiner* — Saul Rodriguez
*Assistant Examiner* — Gabriela Puig
(74) *Attorney, Agent, or Firm* — Boyle Fredrickson, S.C.

(57) ABSTRACT

A sifting scoop for removing pet waste from litter in a litter box having a handle carrying a sifting cup having a mouth wider than a downstream pet waste retaining pocket formed by the cup. The handle overlies the sifting cup providing a waste shield. The handle includes a grip attached by a bridge to the cup that provides a hand guard and scoop hanger with the grip serving as a leg when the scoop is stood uprightly on a pedestal formed by a cup endwall. The cup has a first sifting portion formed in a litter-engaging surface on the side opposite the handle with the sifting portion formed by a plurality of elongate slots that are wavy or S-shaped extending longitudinally in the direction of scooping. The cup has a second sifting portion having slots in the end wall inline with litter being scooped.

33 Claims, 7 Drawing Sheets

U.S. PATENT DOCUMENTS

| | | |
|---|---|---|
| D552,916 S | 10/2007 | Bodum |
| 7,523,973 B2 | 4/2009 | Lin et al. |
| D613,134 S * | 4/2010 | McRorie et al. ............... D7/691 |
| D619,427 S * | 7/2010 | Poteet ........................... D7/667 |
| D628,861 S * | 12/2010 | Lane .............................. D7/667 |
| 2005/0029297 A1 | 2/2005 | Hughes |
| 2005/0076846 A1 | 4/2005 | Tsengas et al. |
| 2006/0156991 A1 | 7/2006 | Burns |
| 2006/0180512 A1* | 8/2006 | Allen ........................... 209/418 |
| 2007/0267333 A1 | 11/2007 | Delman |

* cited by examiner

SIFTING SCOOP

CROSS REFERENCE TO RELATED APPLICATION

This application is a continuation-in-part of U.S. application Ser. No. 13/068,843, filed Mar. 29, 2010, the entirety of which is hereby expressly incorporated by reference herein.

FIELD

The present invention relates to an apparatus and method for sifting and separating and more particularly to a scoop and method for sifting and separating particulate matter including from feces.

BACKGROUND

Many different types of sifting apparatuses, including sieves and screens, have been employed in the past to sift or sieve one type or size of matter from another. Screens or sieves have been used to sift sand, flour, and other particulate or granular matter to remove undesired or unwanted matter as well as to classify the matter being sifted by size. Such sifting apparatuses typically employ a perforate screen having perforations sized for allowing passage of particulate or granular matter having particle sizes smaller than the perforations.

One type of particulate or granular matter that needs frequent sifting is pet or animal litter, often referred to as cat or kitty litter. Cat litter comes in many different formulations configured to absorb excrement, including urine and fecal matter, in a manner that reduces order, minimizes animal contact, and facilitates disposal. Cat litter is made of a mixture of varying sized particles that typically have a maximum width or diameter of no more than about two or three millimeters. Commercially available litters include clumping litters made of granulated bentonite, such as calcium bentonite, quartz-bentonite mixture, or diatomaceous earth-bentonite mixture, and silica based litters made of silica gel or silica crystal.

Pet waste scoops, also referred to as litter scoops, have long been used to sift cat litter to separate pet waste containing fecal matter and litter that has absorbed excrement from unspent litter. An example of one such commercially available pet waste scoop is disclosed in commonly owned U.S. Pat. Nos. 6,578,807 and 6,976,661. The scoop has a handle generally in line with a concave or spoon-shaped perforate sifting body that has an imperforate endwall opposite a lip-containing open end. While this scoop has enjoyed considerable commercial success, improvements nonetheless remain desirable.

For example, because the handle is generally in line with the body but extends in an opposite direction, a user's hand gripping the handle can come in contact with the litter or even undesirably become soiled by pet waste. In addition, relatively small or narrow perforations formed in the body can become clogged such that unspent cat litter does not efficiently pass through them during sifting. This can cause a user to either throw away unspent litter with the pest waste or to have to shake the scoop to dislodge the unspent litter creating considerable dust. Finally, such a scoop is not conveniently stored by itself as it is releasably retained in a holder that stores it in an upright position.

It would be desirable to provide a sifting apparatus that overcomes at least some of these drawbacks.

SUMMARY

The present invention is directed to a sifting apparatus for sifting granular material that is a sifting scoop having a perforate sifting cup defining a pet waste clump retaining pocket that holds a considerable amount of pet waste clumps scooped and sifted from granular pet or animal litter in a litter box. The sifting cup is defined by a sidewall of endless construction that defines the pet waste clump retaining pocket and has a first perforate sifting region with a plurality of elongate sifting slots extending generally longitudinally relative to the cup in the direction of scooping. A front or leading edge of the cup includes an outwardly extending tongue that makes initial contact with litter in a litter box guiding litter and pet waste clumps in the litter through a mouth of the sifting cup and into the pet waste clump retaining pocket. The sidewall that defines the sifting cup is constructed so the mouth has a width wider than that of the pet waste clump retaining pocket in the cup helping to funnel pet waste clumps sifted from unspent litter during scooping into the pocket of the cup.

The sifting cup includes an end that defines an end of the pet waste clump retaining pocket that has a second perforate sifting region disposed at an angle relative to the first perforate sifting region so as to sift and allow through passage of unspent litter that reaches the end of the cup. The cup end is configured to provide a pedestal upon which the sifting scoop can be uprightly stood on a generally flat surface. In a preferred embodiment, the end of the sifting cup is an end wall that orients the second perforate sifting region generally perpendicularly relative to the flow of litter through the sifting cup during scooping. The pedestal is formed by the sifting cup end wall, which is generally planar or flat in a manner that enables it to stably uprightly rest on a flat surface when the sifting scoop is stood uprightly on the end wall. The handle includes an elongate hand grip that is grasped during use by a hand of a user that has a free end that extends outwardly so as to contact the flat surface when the sifting scoop is uprightly stood thereon serving as a leg that helps the scoop to more stably remain upright.

The hand grip can be tubular so as to provide an ergonomic user friendly grip when grasping the handle. The hand grip can have its free end open to enable it to serve as a stake that can be stuck into granular material, e.g., litter, with granular material able to flow through the opening in the free end of the hand grip into the hand grip helping to anchor it in place. In a preferred embodiment, a forward facing end of the hand grip that faces in the same direction as the mouth of the sifting cup is open permitting litter and/or pet waste reaching the open end to flow through the hand grip without contacting the hand of the user.

The hand grip is attached to the sidewall that defines the sifting cup by a bridge that can be curved or arched and which provides a forwardly facing hand guard disposed between a forward facing portion of the bridge and a hand grasping the hand grip. The connecting bridge is disposed adjacent the mouth such that the hand grip portion extends in a rearward direction overlying the sifting cup. In a preferred embodiment, a portion of the sifting cup defining sidewall disposed adjacent the hand grip and facing toward the hand grip is of imperforate construction providing a shield that shields a hand of a user gripping the hand grip during litter scooping and sifting from coming into contact with pet waste and litter. In a preferred embodiment, the hand grip portion and connecting bridge form a hanger or hook that permits the sifting scoop to be hung by its handle on a sidewall of a litter box or the like.

The first perforate sifting region is formed in a litter contacting or engaging surface of the sifting cup defining sidewall that includes a forward-facing tongue that extends outwardly and forwardly of the handle that makes initial contact with the litter during scoop use. The first perforate sifting region includes a plurality of sifting slots that are elongate and extend generally longitudinally in the direction of scooping. In a preferred embodiment, the sifting slots are wavy or S-shaped helping to facilitate more efficient sifting of unspent litter through the slots including via agitation and/or back and forth litter granule movement during scooping and sifting. During scooping and particularly when the scoop is being lifted from litter in the litter box, unspent litter flows through the slots and falls downwardly back into the litter box.

The second perforate sifting region is formed in an end of the pet waste retaining pocket in the sifting cup that is disposed inline with litter and pet waste clumps entering the sifting cup via the mouth during scooping. In a preferred embodiment, the end of the pocket is an endwall of the sifting cup that has a plurality of elongate sifting slots formed in it that allow unspent litter flowing through the scoop during scooping to flow through and out the slots back into the litter box.

While a sifting scoop constructed in accordance with the present invention is particularly well suited for scooping pet waste clumps out of a litter box and sifting unspent litter so it is returned to the litter box, such a sifting scoop can be used for other applications including sifting sand, dirt, and other granular matter.

DRAWING DESCRIPTION

One or more preferred exemplary embodiments of the invention are illustrated in the accompanying drawings in which like reference numerals represent like parts throughout and in which.

Before explaining one or more embodiments of the invention in detail, it is to be understood that the invention is not limited in its application to the details of construction and the arrangement of the components set forth in the following description or illustrated in the drawings. The invention is capable of other embodiments, which can be practiced or carried out in various ways. Also, it is to be understood that the phraseology and terminology employed herein is for the purpose of description and should not be regarded as limiting.

DETAILED DESCRIPTION

FIGS. 1-8 illustrate a preferred embodiment of a sifting apparatus 20 that is a sifting scoop 22 for sifting granular or particulate matter 24 and is particularly well suited for separating larger matter, namely pet waste 26, from smaller granular or particulate matter 24 that is pet or animal litter 28 disposed in a litter box 30. Such a scoop 22 is also well suited for sifting other types of granular material, including sand, dirt and the like.

Figure 2:
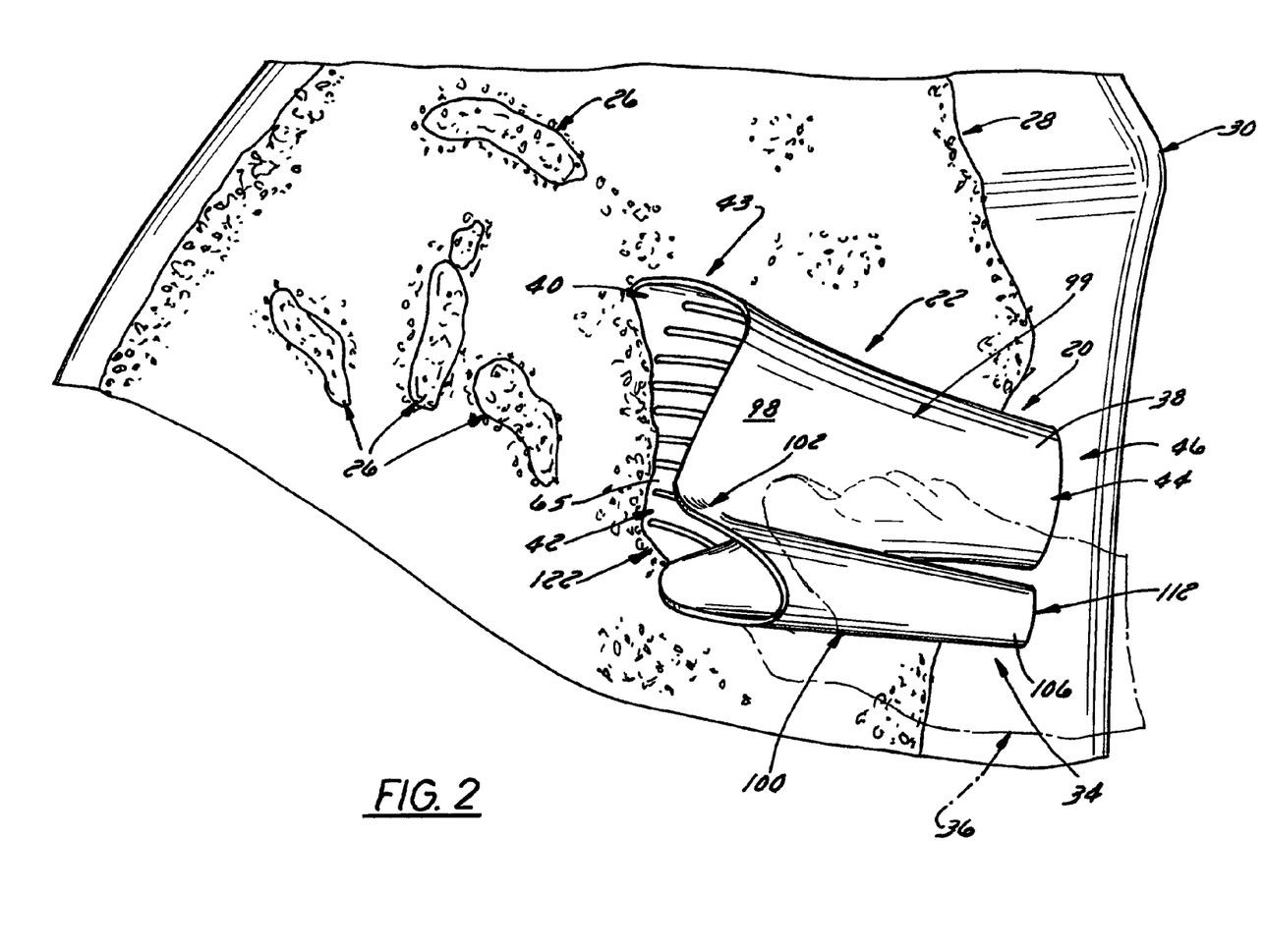
FIG. 2 is a top perspective view of the scoop inserted into the litter separating clumps of pet waste disposed in the litter from unused litter.
Figure 3:
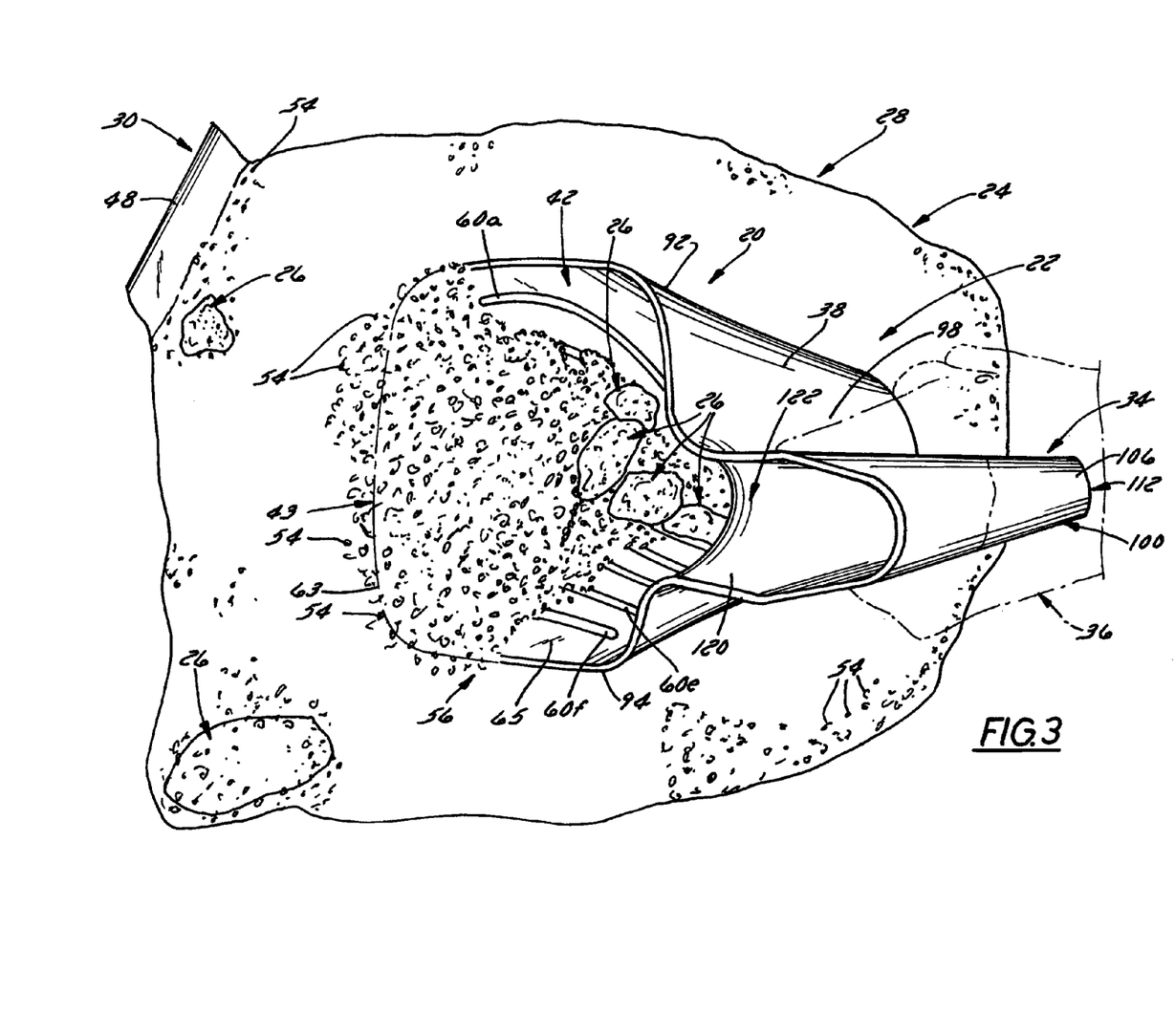
FIG. 3 is a top perspective view of the scoop inserted in the litter in the litter box and disposed in a generally horizontal scooping position.
Figure 4:
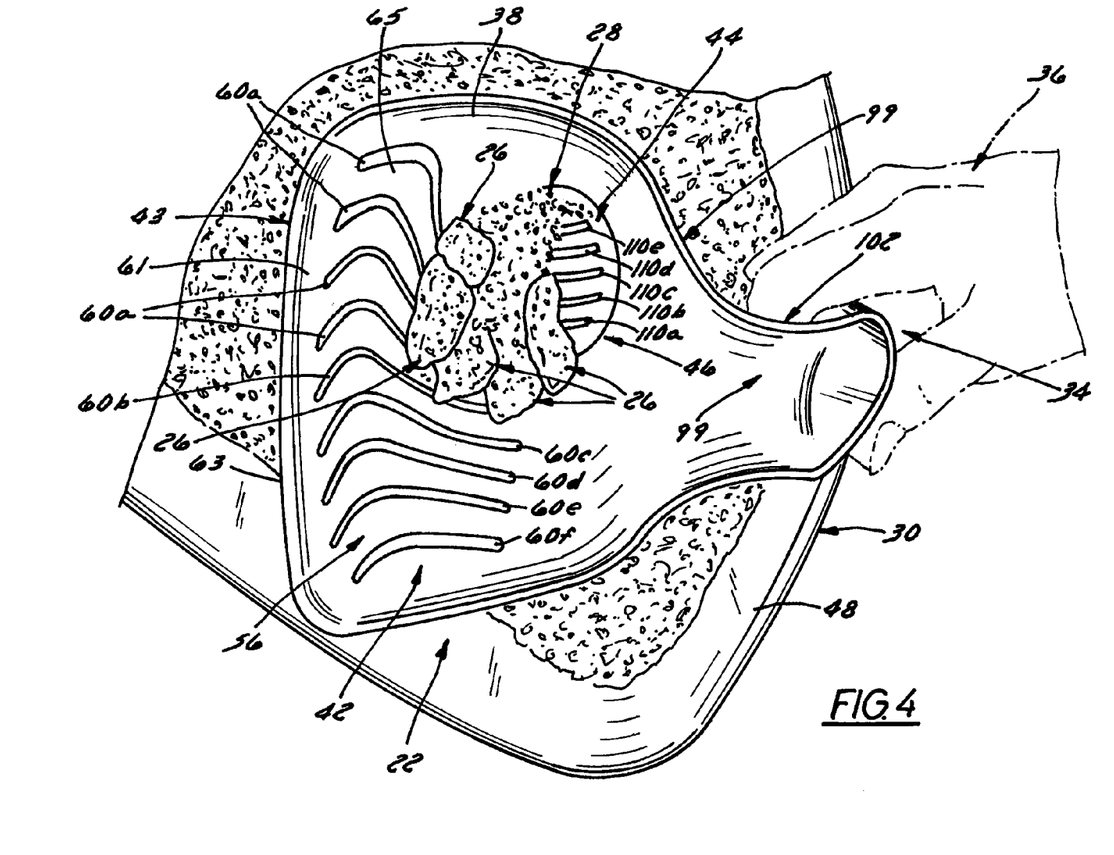
FIG. 4 is top perspective view of the scoop being lifted out of litter in the litter box oriented in a generally upwardly angled sifting position.

The scoop 22 has a sifting cup 32 from which a handle 34 extends that overlies the sifting cup 32 such that the cup 32 is disposed between a hand 36, shown in phantom in FIGS. 2-4, of a user grasping the handle 34, and pet waste 26 and litter 28 during use of the scoop 22. The sifting cup 32 has a sidewall 38 with a mouth 40 at one end through which litter 28 enters during scooping, a first perforate sifting region 42 formed in a litter engaging or contacting face 43 of the sidewall 38 that faces toward and contacts litter 28 in the litter box 30 during scooping, and a second perforate sifting region 44 formed in an end 46 of the cup 32 opposite the mouth 40 out which unspent litter 28 flows back into the litter box 30 during scooping and sifting. As is shown by the drawing figures, the sidewall 38 can be and preferably is of endless construction. The handle 34 is curved so as to overlie the sifting cup 32 during scoop use with a portion of the handle 34 spaced from the sidewall 38 of the cup 32 as discussed in more detail below positioning the hand 36 of a user gripping the handle 34 so it always is spaced from and overlies the first perforate sifting region 42 helping to keep the hand 36 from contacting litter 28 and pet waste 26 during use.

Figure 1:
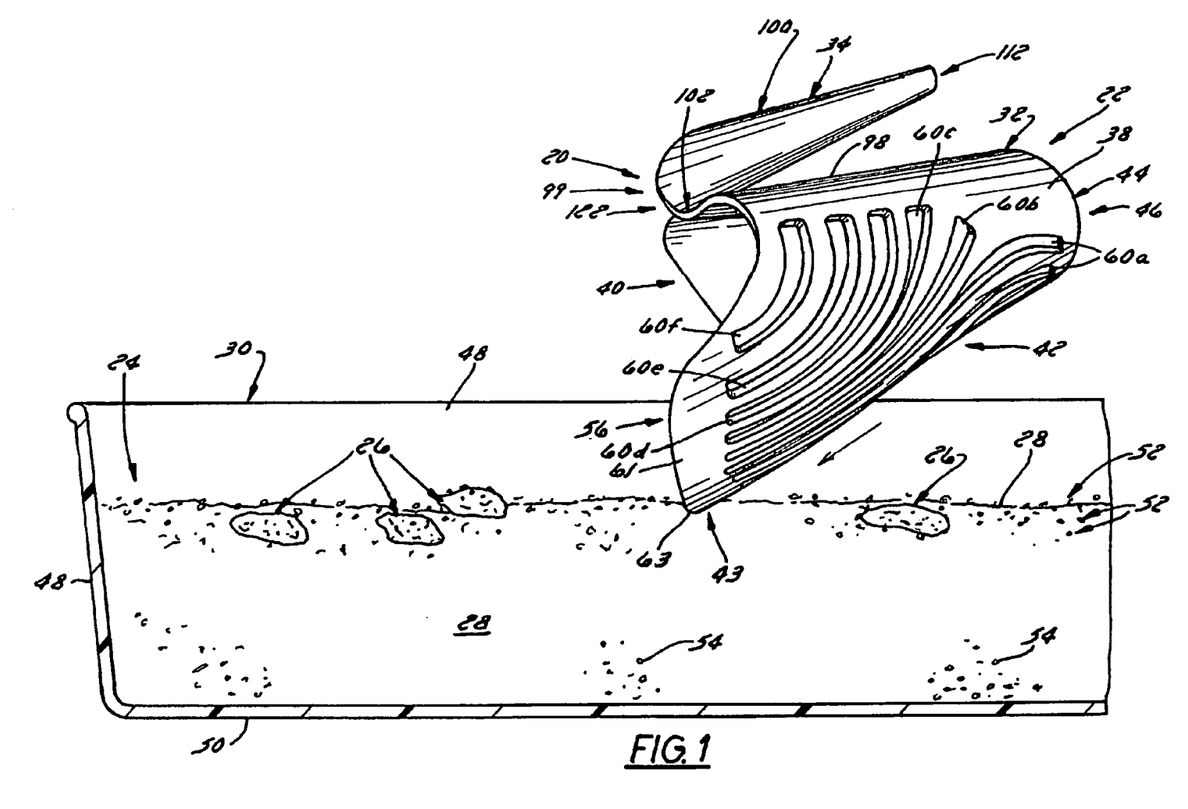
FIG. 1 is a partial fragmentary cross-sectional of a portion of a litter box with a preferred embodiment of a sifting scoop constructed in accordance with the present invention being inserted into litter in the litter box.

The litter box 30 is best shown in FIGS. 1-4. The litter box 30 includes at least one sidewall 48 that extends upwardly from a bottom wall 50 forming a container that holds litter 28. The litter box 30 can have any one of a variety of shapes, such as circular, triangular, square, rectangular, etc. and can have an open top or be covered and include at least one opening permitting entry and exit. The granular litter 28 is formulated to absorb waste material, typically urine, excreted by an animal, such as a cat, forming clumps that along with solid fecal matter are collectively referred to as pet waste 26, clumped pet waste 26 or pet waste clumps 26 herein. Such litter 28 includes clumping litter formulated with granulated bentonite, silica and/or another granular or particulate material capable of absorbing liquid and clumping with the litter box 30 holding at least a plurality of pairs, i.e., at least three, of layers 52 of litter granules or grains 54 in it as depicted in FIG. 1. As is shown in FIG. 1, the litter box 30 is constructed so it can be filled with at least a plurality of inches or centimeters of litter 28.

Figure 5:
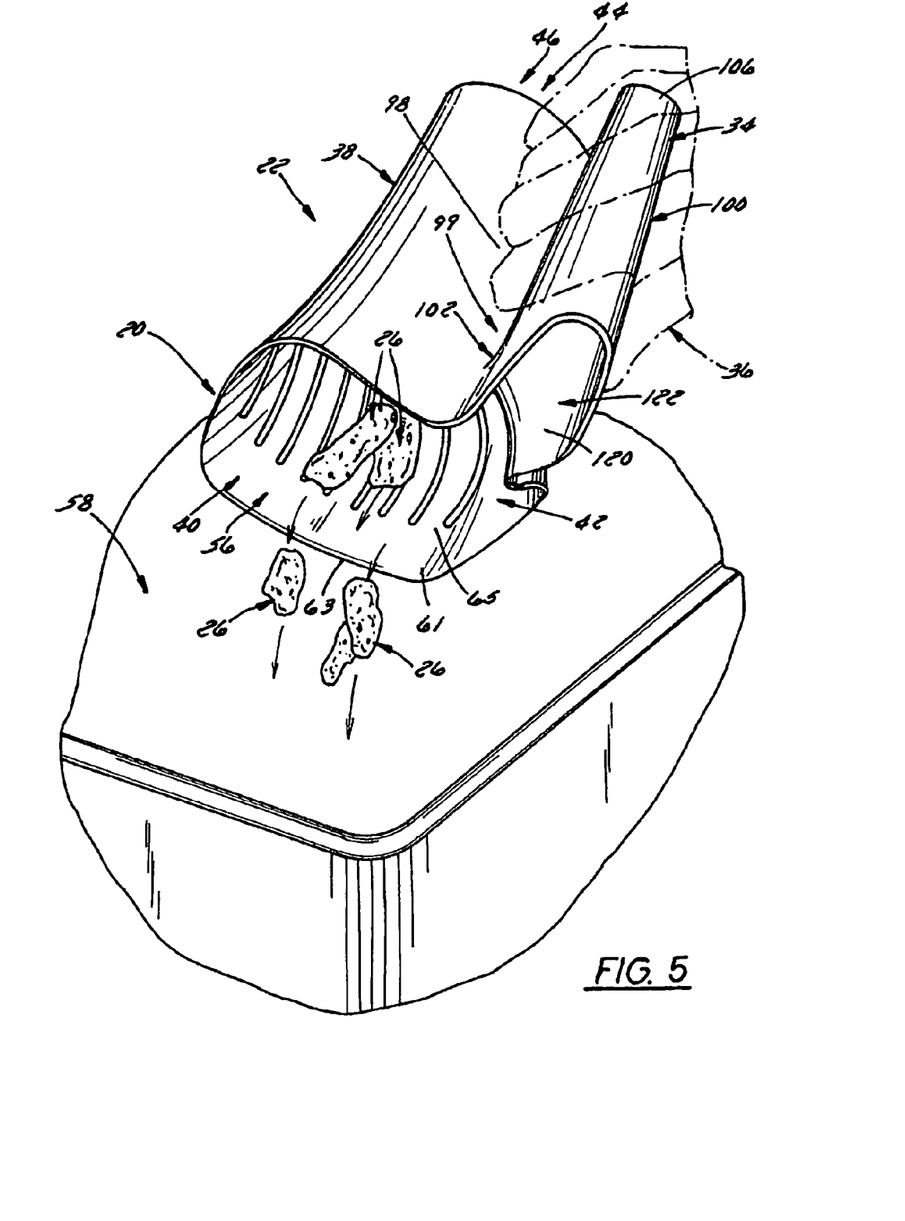
FIG. 5 is a top perspective view of pet waste being dumped from the scoop into a waste container.

As is best shown in FIG. 4, the sifting cup 32 defines a retaining pocket 56 in which larger particulate matter, namely pet waste clumps 26, is retained during and after scooping and sifting. As best shown in FIG. 5, during scooping and sifting, substantially all of the smaller grained unused litter 28 flow through the perforate sifting regions 42 and 44 back into the litter box 30, thereby maximizing the useful or effective life of the litter 28 in the box 30 while leaving behind pet waste 26 in the retaining pocket 56 once scooping and sifting is completed. With continued reference to FIG. 5, after scooping and sifting, the scoop 22 is maneuvered by the user to dump the contents of the retaining pocket 56 of the sifting cup 32 into a container 58, such as a refuse container, waste receptacle, garbage can, or the like. If desired, the pet waste clumps 26 can be dumped from the scoop 22 into a bag (not shown), such as a plastic garbage bag or the like.

Figure 6:
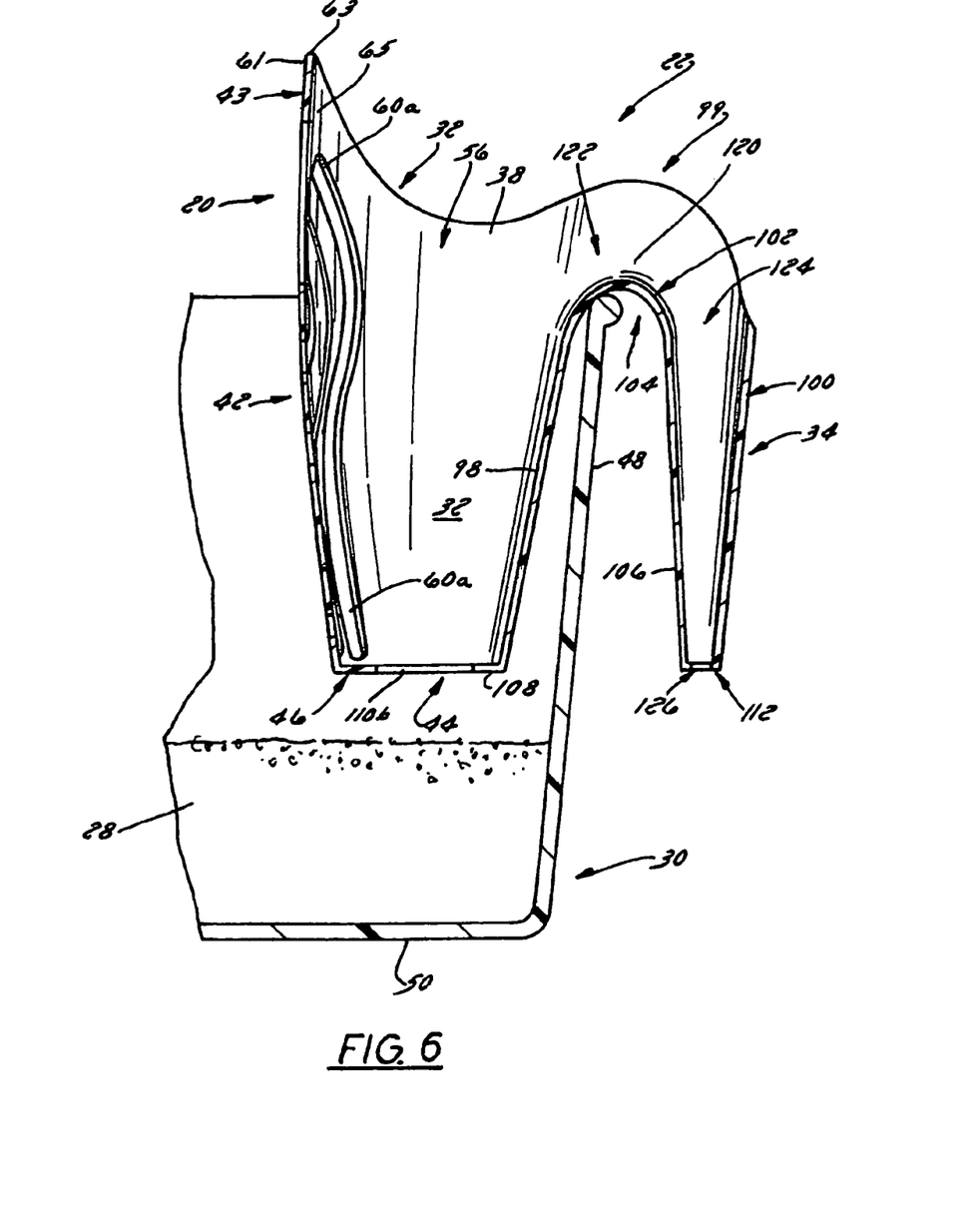
FIG. 6 is a cross-sectional view of the scoop hung by its handle on a sidewall of the litter box.
Figure 7:
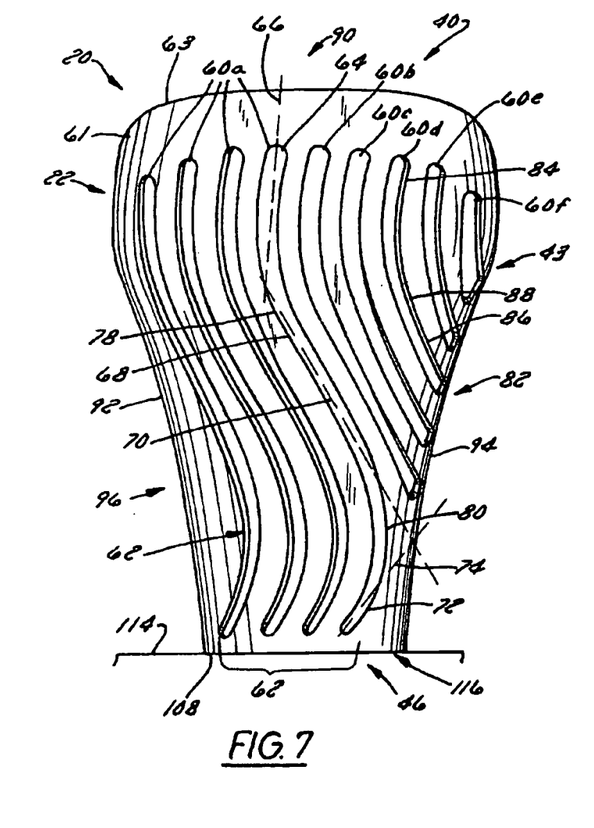
FIG. 7 is a front elevation view of the scoop illustrating sifting slots of a first sifting region with the scoop standing uprightly on a flat surface.
Figure 8:
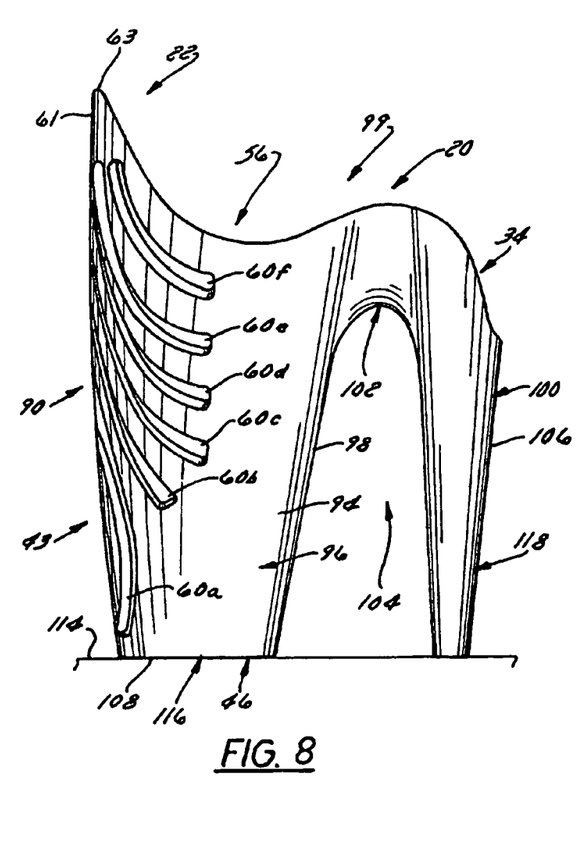
FIG. 8 is a side elevation view of the scoop standing uprightly on a flat surface.

With reference to FIGS. 6-8, the sidewall 38 that defines the sifting cup 32 is tubular with the first perforate sifting region 42 being disposed generally horizontally during use and formed by a plurality of pairs of sifting slots 60a, 60b, 60c, 60d, 60e and 60f that extend in a longitudinal direction along the litter engaging face 43 of the cup-defining sidewall 38 that are elongate and non-straight in construction. As best shown in FIG. 7, the first perforate sifting region 42 includes a first array 62 of a plurality of sifting slots 60*a* that each generally have an S-shape and generally parallel one another. The array 62 of S-shaped or wavy sifting slots 60*a* extend from an inboard imperforate margin 61 of an outwardly extending tongue 63 of the litter engaging face 43 that forms a leading edge of the sifting cup 32 that helps guide litter 28 and pet waste clumps 26 through the mouth 40 and into the cup 32 during scoop use. As is shown in FIGS. 1-3, 6 and 8, the leading edge defined by the tongue 63 extends outwardly beyond the forward most portion of the handle 34 such that tongue 63 makes first contact with litter 28 and pet waste clumps 26 in the litter box 30 during use of the scoop 22. As is shown by FIG. 7, the first array 62 has a plurality of pairs of S-shaped sifting slots 60*a*.

With continued reference to FIG. 7, each S-shaped sifting slot 60*a* has a first slot leg 64 defined by slot centerline 66 that extends in a generally longitudinal direction toward the end 46 of the cup 32, a second slot leg 68 defined by slot centerline 70 that extends generally diagonally relative to the mouth 40 and cup end 46 at a first angle relative to longitudinal, a third leg 72 defined by slot centerline 74 that extends generally diagonally relative to the mouth 40 and cup end 46 at a second acute angle relative to longitudinal that defines an obtuse angle or is generally perpendicular with the slot centerline 70 of the second leg 68 with a plurality of transition curved slot portions 78 and 80 therebetween. The first generally perforate sifting region 42 also includes a second array 82 of a plurality of sifting slots, 60*b*-60*f*, that are each curved having a first leg 84 (identified only for slot 60*d*) extending generally longitudinally, a second generally diagonally extending leg 86, and a curved transition slot portion 88 therebetween.

Each sifting slot 60*a*-60*f* has a width greater than the average width or diameter of a plurality of litter grains 54 and a width no greater than the width of an average pet waste clump 26. Granular pet litter 28 has a width or diameter that varies between one-half millimeter and two millimeters with pet waste clumps 26 typically being larger than about eight millimeters in width, thickness or diameter. In one preferred scoop embodiment, each slot 60*a*-60*f* has a width of at least about three millimeters and no greater than about six millimeters to sift pet waste clumps 26 from unspent litter. In another preferred scoop embodiment, each slot 60*a*-60*f* has a width of about five millimeters and can range in slot width between four and six millimeters.

As a result of this construction, litter grains 54 being scooped into the sifting cup 32 travel within the cup 32 along an interior surface 65 opposite and relative to the litter engaging face 43 in a longitudinal direction toward the end 46 of the cup 32. As each litter grain 54 travels longitudinally, it follows a path that causes it to flow through one of the sifting slots 60*a*-60*f* with its path typically crossing or intersection one of the slots 60*a*-60*f* in a plurality of places thereby ensuring efficient sifting. In addition, the curved or wavy slots 60*a*-60*f* transversely agitate litter grains 54, e.g. back and forth, as they flow along the contours and into the slots 60*a*-60*f* after entering the sifting cup 32 passing toward the cup end 46 also helping to draw other litter grains 54 that ordinarily would not travel over one of the slots 60*a*-60*f* to flow into and through one of the slots 60*a*-60*f* during scoop use. Such a curved slot construction thereby ensures granular litter entering the mouth 40 and moving longitudinally relative to the sifting cup 32 in the cup 32 encounters open sifting surface area of at least one slot 60*a*-60*f* and typically at least a plurality of slots 60*a*-60*f*.

With reference to FIGS. 7 and 8, the litter engaging surface 43 has a generally flat central section 90 that is transversely curved along opposed sides 92 and 94 of the sifting cup 32 with the sides 92 and 94 converging toward one another at the end 46 of the cup 32. As a result of such a necked down or funnel-shaped sifting cup construction, the larger surface area of the portion of the first perforate sifting region 42 adjacent the mouth 40 of the cup 32 causes a greater amount of unspent litter 28 to pass through the portions of the slots 60*a*-60*f* adjacent the mouth 40. As a result, less sifting slot surface area downstream of the mouth 40 closer to the end 46 of the cup 32 is required with the necked down region 96 adjacent the cup end 46 results in a relatively deep pet waste clump retaining pocket 56 formed in the sifting cup 32 that holds a considerable amount of pet waste clumps 26 as compared to conventional scoops. Such a funnel-shaped construction results in a wide mouth 40 that is wider than the pet waste clump retaining pocket 56 thereby helping to scoop and sift relatively large amounts of litter 28 in a litter box 30 and more readily direct flow into the sifting cup 32 during scooping.

As is best shown in FIGS. 4 and 6, the end 46 of the sifting cup 32 is a perforate endwall 108 that has a plurality of spaced apart sifting slots 110*a*-110*e* with a plurality of the slots being elongate and having a width substantially the same as that of slots 60*a*-60*f*. The endwall 108 defines a bottom of the sifting cup 32 that allows passage of unspent litter 28 inside the cup 32 during scooping and sifting, particularly when the cup 32 is tilted or oriented generally uprightly. For example, as is shown in FIGS. 1-4, during use, the scoop 22 is inserted into litter 28 in the litter box 30, manually pushed or pulled in a generally horizontal direction through the litter 28 by the user with their hand 36, and tilted upwardly as the user lifts the scoop 22 out of the litter 28 in the litter box 30. While the scoop 22 is being urged generally horizontally through the litter 28 in the litter box 30, such as depicted in FIGS. 2 and 3, unspent litter 28 passes through the sifting slots 60*a*-60*f* in the litter engaging face 43 and through the slots 110*a*-110*e* in the sifting cup endwall 108. As the scoop 22 is lifted out of the litter 28 in the litter box 30 and tilted upwardly, additional unspent litter 28 flows out slots 60*a*-60*f* and slots 110*a*-110*e*. As a result of the relatively efficient sifting action produced by a scoop 22 constructed in accordance with the present invention, less dust is advantageously created during sifting and more unspent litter 28 is returned.

The sifting slots 60*a*-60*f* formed in the litter engaging face 43 are disposed horizontally during scooping and the sifting slots 110*a*-110*e* are disposed at an angle relative to the litter engaging face 43 such that some litter 28 flowing into the sifting cup 32 during scooping flows out the sifting slots 110*a*-110*e* in the cup endwall 108. In the preferred scoop embodiment shown in the drawing figures, the sifting slots 110*a*-110*e* formed in the cup endwall 108 are generally perpendicularly oriented relative to the flow of litter 28 passing through the sifting cup 32 when the scoop 22 is disposed in the generally horizontal scooping position shown in FIG. 3 as well as the generally uprightly angled sifting position shown in FIG. 4. When the scoop 22 is disposed in the sifting position, such as the sifting position shown in FIG. 4, the scoop 22 is either upwardly angled relative to horizontal and being pulled out of litter 28 in the litter box 30 or completely clear of litter 28 in the litter box 30 as shown in FIG. 4.

The sifting slots 60*b*-60*f* extend along a portion of one of the sides 94 of the sidewall 38 that defines the sifting cup 32 as the direction of the slots 60*b*-60*f* encourage flow of unspent litter 28 generally in the direction of the slots 60*b*-60*f* and through the slots 60*b*-60*f*. Extending along both sides 92 and 94 is an imperforate rear sidewall portion 98 that is disposed between a hand 36 of a user gripping the handle 34 and the retaining pocket 56. This imperforate rear sidewall portion 98 serves as a shield for advantageously preventing the hand 36 of a user gripping the handle 34 from coming into contact with litter 28 in the litter box 30 and litter 28 in the sifting cup 32. This shield 98 thereby also advantageously prevents the hand 36 of a user gripping the handle 34 from coming into contact with pet waste clumps 26 in the litter box 30 and in the sifting cup 32 during scooping and sifting. As is also depicted by FIGS. 2-4, a bridge 102 that connects the hand grip 100 of the handle 34 to the sifting cup 32 forms a forwardly-facing hand guard 99 that protects the forward most part of the hand 36 holding the grip 100 immediately adjacent and behind the bridge 102.

FIGS. 2-6 illustrate that the handle 34 has a hand grip 100 joined to part of the rear of the sifting cup 32 by an arched bridge 102 that collectively defines a hanger or hook 104 with the rear sidewall portion 98 that enables the scoop 22 to be hung over the sidewall 48 of a litter box 30 such as in the manner depicted in FIG. 6. As is shown in FIG. 6, after use, the scoop 22 can be hung in a sanitary manner with the sifting cup 32 disposed inside the litter box 30 and the handle 34 disposed outside the litter box 30 such that the handle 34 is presented to a user for quick and easy grasping with their hand 36. Although the scoop 22 is shown in FIG. 6 hung over the sidewall 48 of a litter box 30, it should be recognized that the hanger 104 formed by the handle 34 and rear sidewall portion 98 of the sifting cup 32 can be hung over or on other similarly configured walls and the like.

In addition to being configured to provide a hanger 104, the hand grip 100 of the handle 34 has a tubular sidewall 106 that diametrically tapers or necks down from a larger diameter portion adjacent the connecting bridge 102 toward its free end 112. The rounded or arched bridge 102 is contoured as shown in FIG. 9 thereby helping form a user friendly handle 34 with the hand grip 100 that is easily and firmly grasped enabling pulling or pushing force to be easily and efficiently transferred by a user to the scoop 22 to urge it through litter 28 in a litter box 30 when the hand 36 of the user grasps the hand grip 100 adjacent or along the bridge 102.

As is best shown in FIGS. 2 and 3, the curved or arched connecting bridge 102 has a generally U-shaped outer surface 120 that defines a curved channel 122 in communication with the mouth 40 of the sifting cup 32 that directs litter 28 and pet waste 26 impinging against the outer surface 120 of the bridge 102 into the cup 32 during passage of the scoop 22 through litter 28 in the litter box 30. As is best shown in FIG. 6, the hand grip 100 has an opening 124 adjacent channel 122 in communication with an opening 126 in its free end 112 such that the hand grip 100 is tubular and hollow. This allows matter impinging against the outer surface 120 of the bridge 102, as well as matter in line with forward-facing handgrip opening 124, to be directed along the channel 122 into the tubular hand grip 100 and exit the opening 126 in its free end 112 without coming into contact with the user during scoop use. In addition, as a result of the tapered construction of the tubular hand grip 100 and the opening 126 in its free end 112, the hand grip 100 can be inserted into litter 28 or other granular material, e.g., sand, like a spike is inserted into the ground, such as for anchoring the hand grip 100 and hence the scoop 22 in the granular material.

As is depicted in FIGS. 7 and 8, the scoop 22 is also advantageously configured for convenient upright storage on a flat surface 114, such as the floor or ground, when not being used. The sifting cup endwall 108 is configured to provide a generally flat or substantially planar pedestal 116 upon which the cup 32 can be rested on such a flat surface 114. The hand grip 100 of the handle 34 has a length to its free end 112 such that its free end 112 is substantially flush or generally co-planar with the pedestal 116 formed by the sifting cup endwall 108 such that the hand grip 100 provides a leg 118, such as is shown in FIG. 8, which helps promote stability when the scoop 22 is set uprightly on a flat surface 114.

In one preferred embodiment, the scoop 22 is of one-piece, unitary and substantially homogenous construction made of a relatively lightweight and durable material that preferably is dishwasher safe enabling the scoop 22 to be conveniently cleaned. One preferred scoop 22 is molded of plastic, such as polypropylene or the like, but can be made of another material, such as stainless steel, ceramic, porcelain, a composite or another suitable material.

In use, the sifting scoop 22 is manually grasped by a hand 36 of a user grabbing the hand grip 100 of the handle 34 and maneuvering the sifting cup 32 so its outwardly extending tongue 63 moves toward litter 28 in a litter box 30 as depicted in FIG. 1. As is shown in FIG. 2, the hand 36 of the user is wrapped around the hand grip 100 in a golf club style grip with the forefinger of the hand 36 being shielded by the hand guard 99 provided where the connecting bridge 102 attaches the hand grip 100 to the sidewall 38 of the sifting cup 32. The user maneuvers the sifting scoop 22 so its tongue 63 is inserted into the litter 28 causing litter 28 to enter the mouth 40 of the sifting cup 32 as further depicted in FIG. 2. As the user further maneuvers the scoop 22 during generally horizontal scooping of the litter 28, pet waste clumps 26 and litter 28 enter the sifting cup 32 through the mouth 40 as depicted in FIG. 3. Additional generally horizontal movement during scooping causes the litter 28 to flow farther into the sifting cup 32 carrying pet waste clumps 26 toward the perforate endwall 108 of the cup 32 as further depicted in FIG. 3. With continued reference to FIG. 3, additional generally horizontal scooping movement of the scoop 22 relative to litter 28 in the litter box 30 while the tongue 63 and litter engaging face 43 of the cup-define sidewall 38 are immersed in litter 28 in the box 30 causes unspent litter 28 to flow through the sifting slots 110a-110e in the cup endwall 108 sifting the litter 28 from the pet waste clumps 26 which are retained in the pocket 56 in the sifting cup 32. When the scoop 22 is lifted out of litter 28 in the litter box 30, such as in the manner depicted in FIG. 4, the scoop 22 is maneuvered so it is tilted upwardly causing unspent litter 28 in the cup 32 to be sifted from pet waste clump 26 retained in the cup 32 by flowing out the sifting slots 60a-60f in the sifting region 42 in the litter engaging face 43 of the cup sidewall 38. With continued reference to FIG. 4, during sifting unspent litter 28 also flows out the slots 110a-110e in the cup endwall 108 leaving behind pet waste clumps 26 to be disposed of in a garbage container 58 such as in the manner depicted in FIG. 5. All the while the hand 36 of the user is protected from contact by the portion 98 of the cup-defining sidewall 38 disposed between the litter engaging face 43 and by the hand guard 99 provided by the connecting bridge 102 that connects the hand grip 100 to the cup 32. Upon being finished with the scoop 22, the scoop 22 can be hung by the hanger or hook 104 provided by its handle 34, such as in the manner depicted in FIG. 6, or stood uprightly on the pedestal provided by its endwall 108 on the floor 114, such as in the manner depicted in FIGS. 7 and 8, with the hand grip 100 serving as a leg 118 that helps keep the scoop 22 standing on the floor in the upright position.

Various alternatives are contemplated as being within the scope of the following claims particularly pointing out and distinctly claiming the subject matter regarded as the invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

What is claimed is:

1. A sifting scoop comprised of a handle carrying a sifting cup formed of an endless sidewall having a mouth at one end, a perforate bottom at an opposite end, and a perforate sifting region formed in a granular material contacting face of the sidewall opposite the handle that is disposed toward granular material in a container during sifting, wherein the granular material contacting face has a generally flat central section adjacent the mouth and extends from adjacent the perforate bottom to adjacent a scoop tongue that forms a leading scoop edge extending along the mouth adjacent the perforate sifting region guiding granular material into the sifting cup onto the perforate sifting region downstream of the mouth during scooping and sifting, and wherein the endless sidewall necks down toward the perforate bottom generally imparting a funnel shape to the sifting cup such that the mouth is wider than the perforate bottom.

2. The sifting scoop of claim 1 wherein the handle is attached to the sidewall adjacent the mouth opposite the scoop tongue with the handle extending alongside the sidewall generally parallel to the sidewall from adjacent the mouth toward the perforate bottom, and wherein the outer scoop tongue extends outwardly beyond where the handle attaches to the sidewall.

3. The sifting scoop of claim 2 wherein the sidewall has a pair of imperforate transversely curved sides respectively extending alongside the perforate sifting region between the perforate sifting region and an imperforate portion of the sidewall extending from one imperforate side to the other imperforate side opposite the perforate sifting region that is disposed between the handle and the perforate sifting region.

4. The sifting scoop of claim 1 wherein the perforate bottom comprises a pedestal upon which the sifting scoop is uprightly supportable on a flat surface.

5. The sifting scoop of claim 4 wherein the handle defines a leg that engages the flat surface when the sifting scoop is uprightly supported on the flat surface helping to keep the sifting scoop upright.

6. The sifting scoop of claim 1 wherein the sifting cup comprises a hand shield preventing a hand grasping the handle from coming into contact with granular material during scooping and sifting of granular material, the hand shield comprised of an imperforate portion of the sidewall opposite the perforate sifting region that is disposed between the handle and the perforate sifting region.

7. The sifting scoop of claim 6 further comprising a hand guard attaching the handle to the sidewall adjacent the mouth.

8. The sifting scoop of claim 7 wherein the hand shield comprises an imperforate portion of the sidewall extending opposite the perforate sifting region that is located between the handle and the perforate sifting region.

9. The sifting scoop of claim 1 wherein the perforate sifting region is comprised of a plurality of spaced apart and non-straight sifting slots that each extend longitudinally from adjacent the mouth toward the perforate bottom.

10. The sifting scoop of claim 9 wherein a plurality of the sifting slots is wavy or S-shaped.

11. The sifting scoop of claim 9 wherein a plurality of wavy or S-shaped sifting slots are elongate and disposed side-by-side.

12. The sifting scoop of claim 11 wherein the plurality of the sifting slots each have a width greater than a width or diameter of a plurality of grains of granular material for which the sifting scoop is used to sift.

13. The sifting scoop of claim 12 wherein the granular material comprises pet or animal litter, the granular matter contacting face comprises a litter engaging face, and the perforate sifting region is comprised of elongate slots having a slot width wide enough for litter to flow therethrough while retaining clumps of pet waste in the sifting cup.

14. The sifting scoop of claim 1 wherein the first perforate sifting region is generally horizontal during scooping and the perforate bottom is disposed at an angle relative to horizontal during scooping and in line with the flow of granular material being scooped into the sifting cup.

15. The sifting scoop of claim 14 wherein the perforate bottom is oriented generally perpendicular to the perforate sifting region.

16. The sifting scoop of claim 15 wherein granular material comprises litter in a litter box and the perforate sifting region and perforate bottom are configured to separate unspent litter from pet waste clumps in the litter that are retained in the sifting cup after scooping and sifting.

17. The sifting scoop of claim 1 wherein the handle comprises a bridge attaching the handle to the sidewall adjacent the mouth of the sifting cup defining a hand guard adjacent the mouth.

18. The sifting scoop of claim 17 wherein the handle, the bridge attaching the handle to the sidewall, and an adjacent portion of the sidewall extending alongside the handle comprises a hanger.

19. A sifting scoop comprised of an endless sidewall defining a sifting cup having (a) a mouth at one end, (b) a perforate bottom opposite the mouth, (c) a longitudinally extending elongate handle disposed alongside a longitudinally extending imperforate portion of the sidewall, (d) a longitudinally extending granular material contacting face formed of part of the sidewall opposite the imperforate sidewall portion, the granular material contacting face having a longitudinally extending generally flat central section adjacent the mouth extending toward the perforate bottom, the granular material contacting face comprising a perforate sifting region extending from adjacent the mouth substantially to the perforate bottom, and (e) a pair of opposed longitudinally extending sides formed of corresponding portions of the sidewall with one of the sides extending between the granular material contacting face and the imperforate sidewall portion and the other one of the sides extending between the granular material contacting face and the imperforate sidewall portion, wherein the sides converge toward one another from adjacent the mouth to adjacent the perforate bottom such that the mouth is wider than the perforate bottom and the perforate sifting region is wider adjacent the mouth than adjacent the perforate bottom.

20. The sifting scoop of claim 19 wherein the perforate sifting region is comprised of a plurality of spaced apart generally longitudinally extending elongate sifting slots formed therein.

21. The sifting scoop of claim 20 wherein each one of the plurality of longitudinally extending elongate slots extends from adjacent the mouth to adjacent the perforate bottom.

22. The sifting scoop of claim 21 wherein the handle is interconnected to the imperforate portion of the sidewall by an arched bridge forming a sifting scoop hanger upon which the sifting scoop can be hung, wherein the arched bridge comprises a hand guard disposed adjacent the mouth preventing granular material from contacting a hand grasping the handle during scooping and sifting of granular material, and wherein the imperforate portion of the sidewall disposed between the handle and the perforate sifting region comprises a hand shield disposed between granular material entering the sifting cup and a hand grasping the handle also preventing the hand from contacting granular material during scooping and sifting of granular material.

23. The sifting scoop of claim 19 wherein the granular material contacting face has a scoop tongue forming a leading edge of the sifting scoop that extends transversely along the mouth and wherein each one of the plurality of longitudinally extending sifting slots extend from adjacent the tongue toward the perforate bottom.

24. The sifting scoop of claim 23 wherein the handle is attached to the sidewall adjacent the mouth opposite the scoop tongue with the handle extending alongside the sidewall generally parallel to the sidewall from adjacent the mouth toward the perforate bottom, and wherein the outer scoop tongue extends outwardly beyond the handle in a direction opposite the handle.

25. The sifting scoop of claim 24 wherein the granular material contacting face has a transversely extending elongate imperforate margin extending longitudinally from the scoop tongue to an adjacent end of each one of the plurality of longitudinally extending elongate slots.

26. The sifting scoop of claim 19 wherein each one of longitudinally extending converging sides is imperforate.

27. A sifting scoop comprised of an endless sidewall defining a sifting cup having (a) a mouth at one end, (b) a perforate bottom opposite the mouth, (c) a handle having a hand grip disposed alongside and generally parallel to a longitudinally extending imperforate portion of the sidewall, (d) a generally longitudinally extending granular material contacting face formed of part of the sidewall opposite the imperforate sidewall portion, the granular material contacting face comprising (i) a perforate sifting region extending from adjacent the mouth to adjacent the perforate bottom with the perforate sifting region comprised of a plurality of generally longitudinally extending elongate slots, and (ii) a generally flat central section extending from adjacent the mouth toward the perforate bottom, and (e) a pair of opposed longitudinally extending sides formed of corresponding portions of the sidewall with one of the sides extending between the granular material contacting face and the imperforate sidewall portion from adjacent the mouth to adjacent the perforate bottom and the other one of the sides extending between the granular material contacting face and the imperforate sidewall portion from adjacent the mouth to adjacent the perforate bottom, wherein the sides converge toward one another in a longitudinal direction from adjacent the mouth to adjacent the perforate bottom such that the mouth is wider than the perforate bottom and the perforate sifting region is wider adjacent the mouth than adjacent the perforate bottom.

28. The sifting scoop of claim 27 wherein each one of the plurality of elongate sifting slots extends generally in a longitudinal direction from adjacent the mouth to adjacent the perforate bottom.

29. The sifting scoop of claim 28 wherein each one of the plurality of elongate sifting slots is not straight.

30. The sifting scoop of claim 29 wherein each one of the plurality of elongate sifting slots is wavy or generally S-shaped.

31. The sifting scoop of claim 27 wherein the perforate bottom is comprised of a plurality of elongate sifting slots.

32. The sifting scoop of claim 27 wherein each one of longitudinally extending converging sides is imperforate.

33. A sifting scoop comprised of an endless sidewall defining a sifting cup having (a) a mouth at one end, (b) a perforate bottom opposite the mouth comprised of a plurality of slots formed therein, (c) a handle having a hand grip disposed alongside and generally parallel to a longitudinally extending imperforate portion of the sidewall, (d) a generally longitudinally extending granular material contacting face formed of part of the sidewall opposite the imperforate sidewall portion, the granular material contacting face comprising (i) a perforate sifting region extending from adjacent the mouth to adjacent the perforate bottom with the perforate sifting region comprised of a plurality of generally longitudinally extending elongate sifting slots that each extend from adjacent the mouth to adjacent the perforate bottom, and (ii) a generally flat central section extending generally longitudinally from adjacent the mouth toward the perforate bottom, and (e) a pair of opposed generally longitudinally extending imperforate sides formed of corresponding portions of the sidewall with one of the sides extending between the granular material contacting face and the imperforate sidewall portion from adjacent the mouth generally longitudinally to adjacent the perforate bottom and the other one of the sides extending between the granular material contacting face and the imperforate sidewall portion from adjacent the mouth generally longitudinally to adjacent the perforate bottom, wherein the sides converge toward one another in a generally longitudinal direction from adjacent the mouth to adjacent the perforate bottom such that the mouth is wider than the perforate bottom and the perforate sifting region is wider adjacent the mouth than adjacent the perforate bottom, and wherein the perforate bottom is generally flat comprising a pedestal upon which the sifting scoop can be uprightly stood.

\* \* \* \* \*